United States Patent
Dherde et al.

(10) Patent No.: US 11,480,385 B2
(45) Date of Patent: Oct. 25, 2022

(54) VACUUM INSULATED PANEL FOR COUNTERACTING VACUUM BOW INDUCED DEFORMATIONS

(71) Applicant: WHIRLPOOL CORPORATION, Benton Harbor, MI (US)

(72) Inventors: Eric J. Dherde, Grand Blanc, MI (US); Lorraine J. Westlake, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/227,873

(22) Filed: Apr. 12, 2021

(65) Prior Publication Data

US 2021/0310723 A1 Oct. 7, 2021

Related U.S. Application Data

(62) Division of application No. 16/876,187, filed on May 18, 2020, now Pat. No. 11,002,477, which is a (Continued)

(51) Int. Cl.
*F16L 59/065* (2006.01)
*F25D 23/06* (2006.01)
(Continued)

(52) U.S. Cl.
CPC ......... *F25D 23/066* (2013.01); *B21D 22/022* (2013.01); *B32B 3/00* (2013.01); (Continued)

(58) Field of Classification Search
None
See application file for complete search history.

(56) References Cited

U.S. PATENT DOCUMENTS 5,252,408 A 10/1993 Bridges et al.
5,509,248 A 4/1996 Dellby et al.
(Continued)

FOREIGN PATENT DOCUMENTS

CN 103958991 A 7/2014
DE 956899 C 1/1957
(Continued)

OTHER PUBLICATIONS

Machine translation of foreign reference N L92017 47, obtained from https://patents.google.com/patent/N L92017 47 A/en?oq= N L9201747 (last accessed on Sep. 10, 2020) (Year: 2020).

*Primary Examiner* — Alexander S Thomas
(74) *Attorney, Agent, or Firm* — Price Heneveld LLP

(57) ABSTRACT

A vacuum insulated cabinet structure includes first and second cover members having pre-deformed portions and perimeter portions. The perimeter portions of the first and second cover members are disposed along first and second planar levels and the pre-deformed portions of the first and second cover members include portions thereof extending outwardly relative to the first and second planar levels. A thermal bridge interconnects the first cover member and the second cover member at the perimeter portions thereof to define an insulating cavity therebetween. The insulating cavity is a sealed cavity having a vacuum drawn therefrom. The pre-deformed portions of the first and second cover members move inwardly towards the first and second planar levels under a force of the vacuum within the insulating cavity.

3 Claims, 11 Drawing Sheets

Related U.S. Application Data division of application No. 16/309,539, filed as application No. PCT/US2016/068505 on Dec. 23, 2016, now Pat. No. 10,697,698.

(51) Int. Cl.
  B21D 22/02 (2006.01)
  B32B 3/00 (2006.01)

(52) U.S. Cl.
  CPC ......... *F16L 59/065* (2013.01); *F25D 2201/14* (2013.01); *Y10T 428/231* (2015.01)

(56) References Cited

U.S. PATENT DOCUMENTS

| | | |
|---|---|---|
| 6,520,746 B2 | 2/2003 | Koo et al. |
| 6,537,034 B2 | 3/2003 | Park et al. |
| 6,715,301 B2 | 4/2004 | Song |
| 6,811,380 B2 | 11/2004 | Kim |
| 6,960,893 B2 | 11/2005 | Yoshida et al. |
| 7,001,154 B2 | 2/2006 | Kim |
| 7,402,977 B2 | 7/2008 | Kim et al. |
| 2005/0158178 A1 | 7/2005 | Yoo et al. |
| 2007/0095073 A1 | 5/2007 | Tian et al. |
| 2007/0140867 A1 | 6/2007 | Bae et al. |
| 2007/0196214 A1 | 8/2007 | Bocchiola |
| 2008/0131292 A1 | 6/2008 | Hong et al. |
| 2014/0360603 A1 | 12/2014 | Godbole |
| 2015/0152635 A1 | 6/2015 | Duforestel et al. |
| 2015/0330071 A1 | 11/2015 | Ogden |

FOREIGN PATENT DOCUMENTS

| | | |
|---|---|---|
| DE | 102010024951 A1 | 12/2011 |
| EP | 2980467 A1 | 2/2016 |
| WO | 2012152610 A2 | 11/2012 |

VACUUM INSULATED PANEL FOR COUNTERACTING VACUUM BOW INDUCED DEFORMATIONS

CROSS-REFERENCE TO RELATED APPLICATIONS

This application is a divisional of U.S. patent application Ser. No. 16/876,187 filed May 18, 2020 now U.S. Pat. No. 11,002,477 titled VACUUM INSULATED PANEL FOR COUNTERACTING VACUUM BOW INDUCED DEFORMATIONS, which is incorporated herein by reference in its entirety.

BACKGROUND

The present device generally relates to insulated structures, and in particular, to vacuum insulated refrigerator cabinets that include vacuum cavities disposed between an exterior wrapper and a liner.

Various types of insulated refrigerator cabinet structures have been developed. One type of insulated cabinet structure includes an exterior wrapper and a liner. The wrapper and liner are generally spaced-apart to form an internal cavity. The cavity is generally filled with an insulating material or a polyurethane foam. In vacuum insulated cabinet structures, the cavity formed between a wrapper and a liner may include a vacuum and an insulating material to form a vacuum insulated structure. Sidewalls of the liner and exterior wrapper are often subject to deformation when drawing a vacuum on the vacuum cavity due to the vacuum pressures involved in such a process. Vacuum insulated structures having repeatable and consistent outer parameters are desired for a clean aesthetic of the wrapper and the liner in a vacuum insulated refrigerator structure.

SUMMARY

One aspect of the present concept includes a vacuum insulated structure having a first cover member having a pre-deformed portion and a perimeter portion. The perimeter portion of the first cover member is disposed along a first planar level and the pre-deformed portion of the first cover member includes portions thereof extending outwardly relative to the first planar level. A second cover member includes a pre-deformed portion and a perimeter portion. The perimeter portion of the second cover member is disposed along a second planar level and the pre-deformed portion of the second cover member includes portions thereof extending outwardly from the second planar level. A thermal bridge interconnects the first cover member and the second cover member at the perimeter portions thereof to define an insulating cavity therebetween. The insulating cavity is a sealed cavity having a vacuum drawn therefrom. The pre-deformed portions of the first and second cover members move inwardly towards the first and second planar levels under a force of the vacuum within the insulating cavity.

Another aspect of the present concept includes a method of making a vacuum insulated cabinet structure. The method includes the steps of: 1) providing an exterior wrapper having a receiving cavity defined by a plurality of sidewalls; 2) outwardly deforming one or more of the sidewalls of the exterior wrapper, such that the sidewalls of the exterior wrapper include pre-deformations outwardly extending beyond a first desired planar level; 3) providing at least one liner having a plurality of sidewalls defining a compartment; 4) outwardly deforming one or more of the sidewalls of the at least one liner, such that the sidewalls of the at least one liner include pre-deformations outwardly extending beyond a second desired planar level; 5) positioning the least one liner in the receiving cavity of the exterior wrapper; 6) providing a thermal bridge interconnecting the exterior wrapper and the at least one liner to define an insulating cavity therebetween having a first interior volume; 7) drawing a vacuum on the insulating cavity; 8) collapsing the pre-deformations of the sidewalls of the exterior wrapper to draw the sidewalls of the exterior wrapper into alignment with the first desired planar level; collapsing the pre-deformations of the sidewalls of the at least one liner to draw the sidewalls of the at least one liner into alignment with the second desired planar level; and 9) decreasing the first interior volume of the insulating cavity to a second interior volume.

Another aspect of the present concept includes a method of making a vacuum insulated structure. The method includes the steps of: 1) providing first and second cover members; 2) pre-deforming the first and second cover members to form pre-deformed portions on each of the first and second cover members, wherein the pre-deformed portion of the first cover member extends outwardly from a first planar level of the first cover member, and further wherein the pre-deformed portion of the second cover member extends outwardly from a second planar level of the second cover member; 3) operably coupling the first and second cover members to one another to form an insulating cavity therebetween; 4) introducing an insulation material into the insulating cavity; 5) drawing a vacuum on the insulating cavity; 6) drawing the pre-deformed portions of the first and second cover members inwardly towards the first and second planar levels of the first and second cover members, respectively, under a force provided by the vacuum; and 7) sealing the insulating cavity to maintain the vacuum.

These and other features, advantages, and objects of the present device will be further understood and appreciated by those skilled in the art upon studying the following specification, claims, and appended drawings.

DETAILED DESCRIPTION OF EMBODIMENTS

Figure 5A:
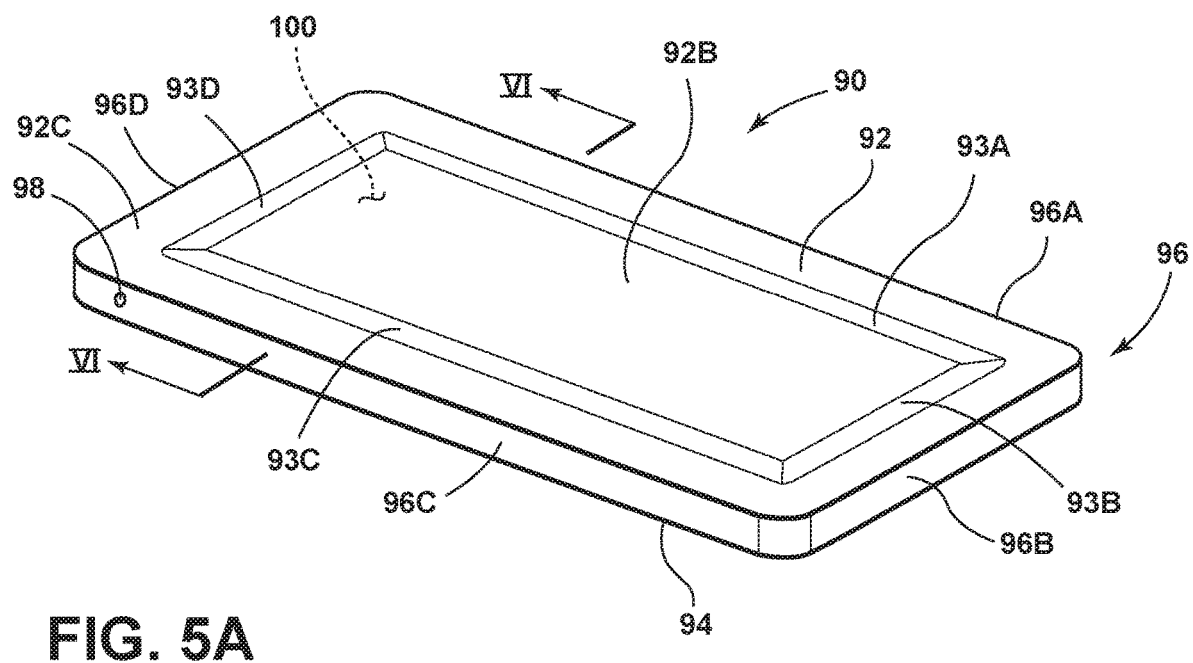
FIG. 5A is a top perspective view of the sidewall of the vacuum insulated cabinet structure of FIG. 4 in an assembled condition and prior to a vacuum being drawn.

For purposes of description herein the terms "upper," "lower," "right," "left," "rear," "front," "vertical," "horizontal," and derivatives thereof shall relate to the device as oriented in FIG. 5A. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
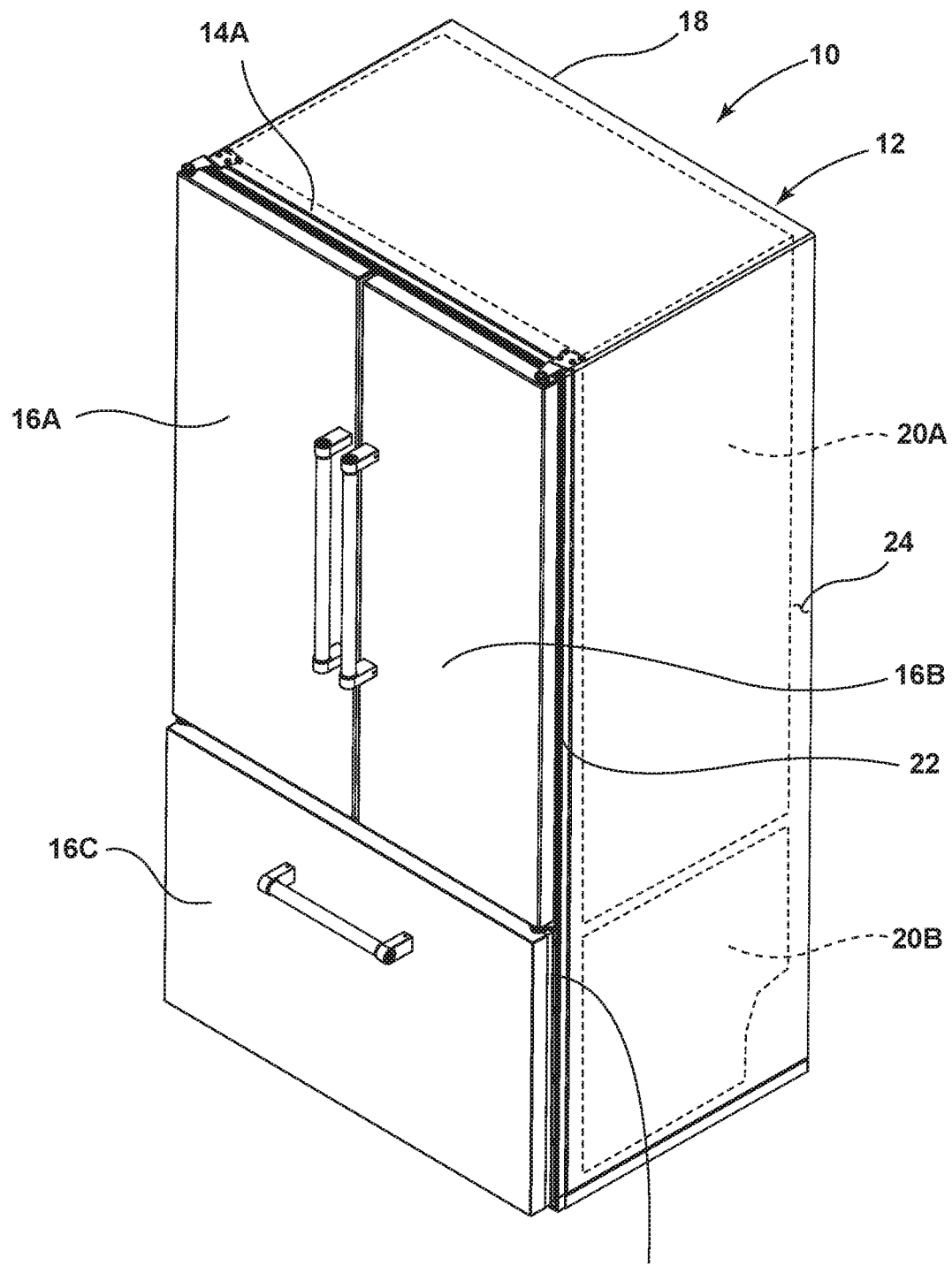
FIG. 1A is a isometric view of a refrigerator including a vacuum insulated cabinet structure.

Referring now to FIG. 1A, a refrigerator 10 is shown having a vacuum insulated cabinet structure 12. The vacuum insulated cabinet structure 12 includes one or more front openings 14A, 14B that may be closed off by doors 16A, 16B and 16C. The doors 16A, 16B are contemplated to pivot between open and closed positions relative to upper front opening 14A. As further found in the illustrated example, door 16C is in the form of a sliding drawer which horizontally slides between open and closed positions for selectively providing access to the lower front opening 14B of the insulated cabinet structure 12.

Figure 1B:
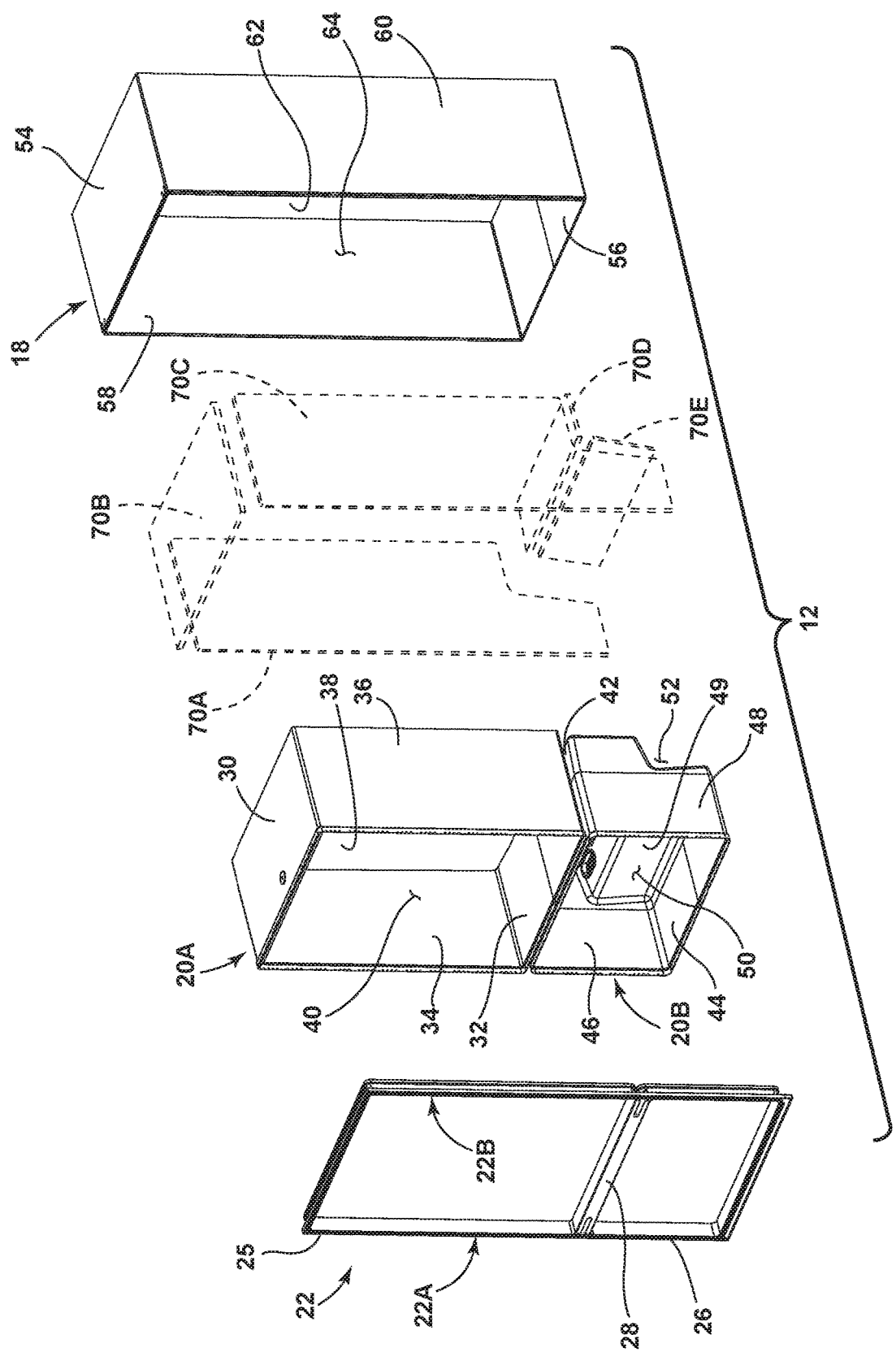
FIG. 1B is an exploded perspective view of another vacuum insulated cabinet structure.

As further shown in FIG. 1A, the vacuum insulated cabinet structure 12 includes an exterior wrapper 18 and upper and lower liners 20A, 20B. In the embodiment shown in FIG. 1A, the upper and lower liners 20A, 20B generally indicate a refrigerator compartment and a freezer compartment, respectively. In assembly, the upper and lower liners 20A, 20B are interconnected with the exterior wrapper 18 via a thermal bridge 22. The thermal bridge 22 is best shown in FIG. 1B. As further shown in FIG. 1A, the exterior wrapper 18 is spaced-apart from the upper and lower liners 20A, 20B to define an insulating cavity 24 therebetween. The insulating cavity 24 is contemplated to be a sealed cavity that may comprise a vacuum core material such as a silica powder or other suitable loose filler material that is inserted (e.g., blown) into the insulating cavity 24 after the exterior wrapper 18, upper and lower liners 20A, 20B and thermal bridge 22 have been coupled together.

Referring now to FIG. 1B, the vacuum insulated cabinet structure 12 is shown in an exploded view. The thermal bridge 22 of the vacuum insulated cabinet structure 12 includes first and second side members 22A and 22B along with upper and lower openings 25, 26 which are configured to align with the upper and lower liners 20A, 20B in assembly. The thermal bridge 22 further includes a mullion portion 28 disposed between the upper and lower openings 25, 26 and extending between the first and second side members 22A, 22B. The upper liner 20A is shown having a top wall 30, a bottom wall 32, opposed side walls 34, 36 and a rear wall 38 (collectively referred to herein as sidewalls) which all cooperate to define a refrigerator compartment 40. Similarly, the lower liner 20B includes a top wall 42, a bottom wall 44, interconnecting sidewalls 46, 48 and a rear wall 49 which all cooperate to define a freezer compartment 50. The rear wall 49 is shown having a stepped configuration to define a spacing 52 which may be used to house various cooling components for cooling both the refrigerator compartment 40 and the freezer compartment 50. The upper and lower liners 20A, 20B may be comprised of a sheet metal material that is folded and welded to define the parameters of the refrigerator compartment 40 and the freezer compartment 50.

As further shown in FIG. 1B, the exterior wrapper 18 includes a top wall 54, a bottom wall 56, opposed sidewalls 58, 60 and a rear wall 62 (collectively referred to herein as sidewalls) which together cooperate to define a receiving cavity 64. The exterior wrapper 18 may be comprised of a sheet metal material that is folded and/or welded to define the parameters of the receiving cavity 64. In assembly, the upper and lower liners 20A, 20B are received in the receiving cavity 64 of the exterior wrapper 18, such that the exterior surfaces of the upper and lower liners 20A, 20B cooperate with the inner surfaces of the exterior wrapper 18 to define the insulating cavity 24 disposed therebetween as shown in FIG. 1A. In the embodiment shown in FIG. 1B, a plurality of vacuum insulated panels 70A-70E are shown configured for insertion into the insulating cavity 24 between the upper and lower liners 20A, 20B and the exterior wrapper 18. The vacuum insulated panels 70A-70E shown in FIG. 1B may include several different configurations of panels used to fill the insulating cavity 24 without departing from the spirit of the present concept. The panels 70A-70E are contemplated to be vacuum insulated panels having a vacuum drawn therefrom to provide superior insulating capabilities as used in the vacuum insulated cabinet structure 12. Polyurethane foam may also be used in the insulation system to provide additional insulation as well as assist in holding the panels 70A-70E in place within the insulating cavity 24. Further, it is contemplated that the insulating cavity 24 may directly receive an insulating material and have a vacuum drawn directly from the insulating cavity 24 to provide a vacuum insulating cabinet structure 12. In this way, the vacuum insulated cabinet structure 12 may include an overall thinner profile to maximize the amount of space available for the refrigerator compartment 40 and the freezer compartment 50 in assembly.

Figure 2A:
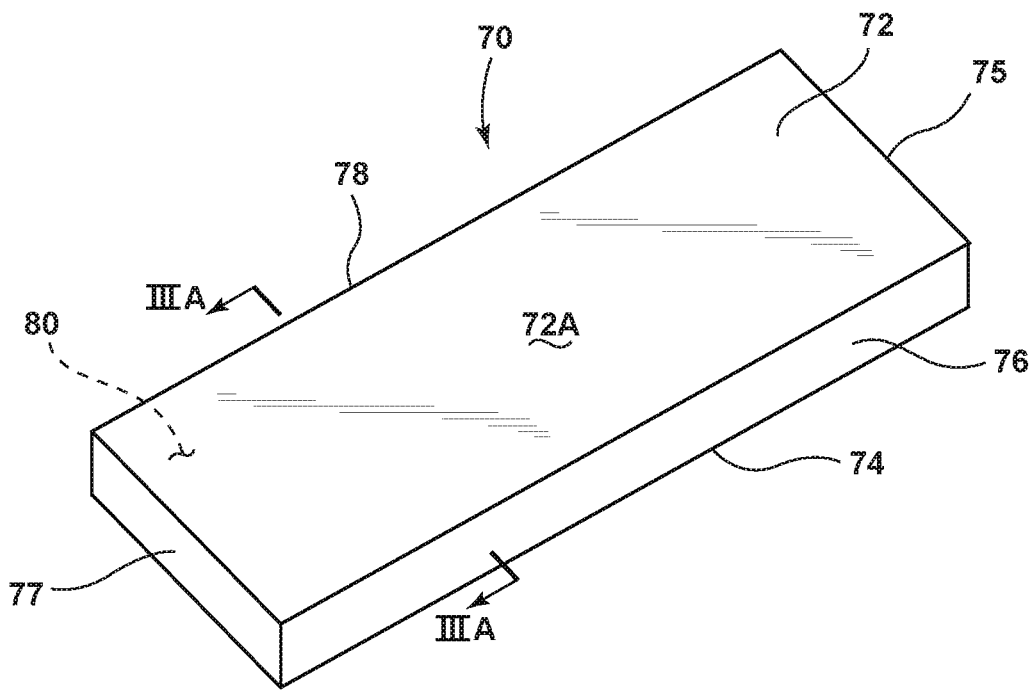
FIG. 2A is a top perspective view of a sidewall of a vacuum insulated cabinet structure prior to a vacuum drawing procedure.

Referring now to FIG. 2A, a vacuum insulated panel 70 is used to describe a deformation effect of a vacuum drawing procedure. The vacuum insulated panel 70 includes upper and lower cover members 72, 74 which are spaced-apart from one another and interconnected by side members 75-78. The side members 75-78 may be side members of a unitary frame structure to which the upper and lower cover members 72, 74 are attached. In assembly, the vacuum insulated panel 70 includes a cavity 80 defined by the upper and lower cover members 72, 74 as spaced-apart from one another and interconnected by side members 75-78. The cavity 80 may be filled with a particulate material, such as a compressed cake of activated carbon black or silica gel, or a mixture of the two. These fillers are designed to fill the cavity 80 and are placed therein before a vacuum is drawn on the panel 70. The filler is indicated by reference numeral 82 and is best shown in FIG. 3A.

Figure 2B:
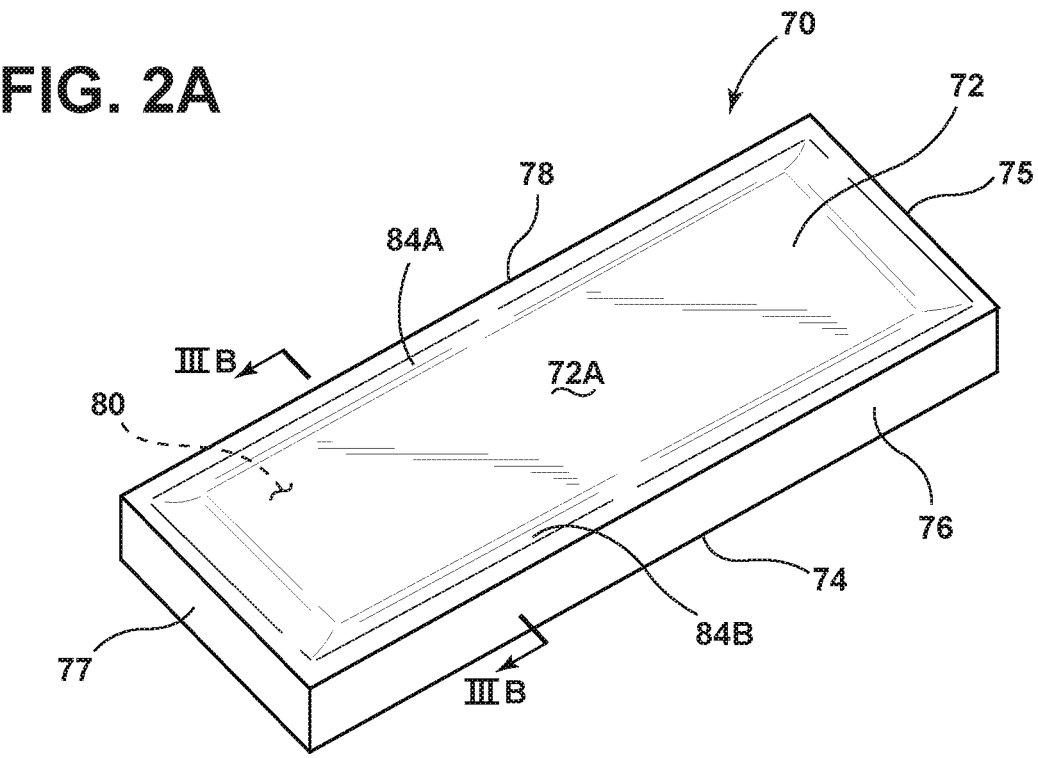
FIG. 2B is a top perspective view of the sidewall of the vacuum insulated cabinet structure of FIG. 2A after a vacuum has been drawn.

Referring now to FIG. 2B, the vacuum insulated panel 70 has had a vacuum drawn on the cavity 80, such that the cavity 80 now defines an evacuated cavity 80. By drawing the vacuum on the vacuum insulated panel 70, the upper and lower cover members 72, 74 have inwardly collapsed towards each other, thereby providing for a deformed outer surface 72A of upper cover member 72 as shown in FIG. 2B. The deformation of the vacuum insulated panel 70 shown in FIG. 2B is best depicted in FIG. 3B.

Figure 3A:
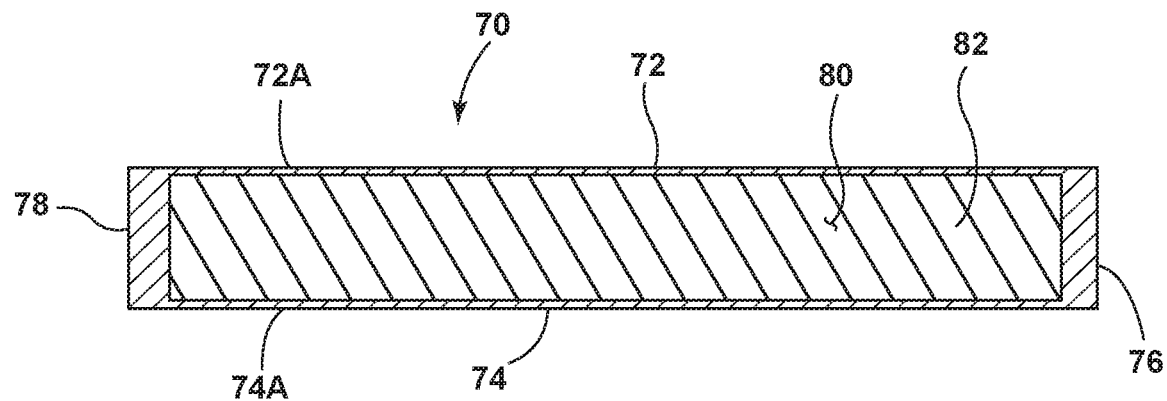
FIG. 3A is a cross-sectional view of the sidewall of the vacuum insulated cabinet structure of FIG. 2A taken at line IIIA.
Figure 3B:
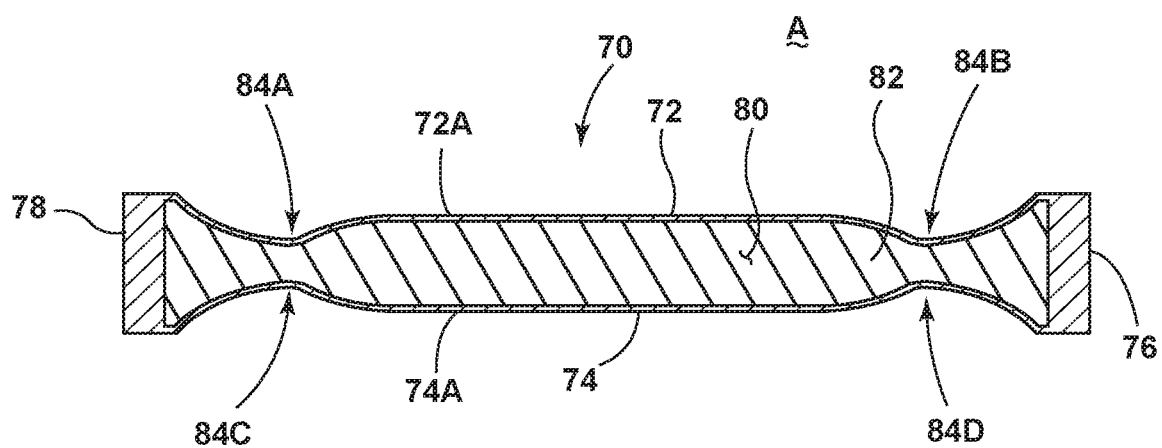
FIG. 3B is a cross-sectional view of the sidewall of the vacuum insulated cabinet structure of FIG. 2B taken at line IIIB.

Referring now to FIG. 3A, the cross-sectional view of the vacuum insulated panel 70 shown in FIG. 2A is depicted, wherein the outer surface 72A of upper cover member 72 and an outer surface 74A of the lower cover member 74 are shown in substantially planar configurations between side members 78, 76. This configuration shown in FIG. 3A is an ideal configuration for a vacuum insulated panel after a vacuum has been drawn on the panel. However, as noted above, when a vacuum is drawn on the vacuum insulated panel 70 of FIGS. 2A and 3A, a deformed vacuum insulated panel 70, as shown in FIGS. 2B and 3B, is often the result. With specific reference to FIG. 3B, the outer surfaces 72A, 74A of the upper and lower cover members 72, 74 are no longer planar outer surfaces, but rather inwardly deformed outer surfaces having specific indent deformations 84A-84D which draw the upper and lower cover members 72, 74 towards one another due to the low pressure of the evacuated cavity 80. The pressure within the evacuated cavity of panel 70 is contemplated to be less than 10 mbar as compared to an atmospheric pressure of 1 atm or 1013.25 mbar.

Figure 10A:
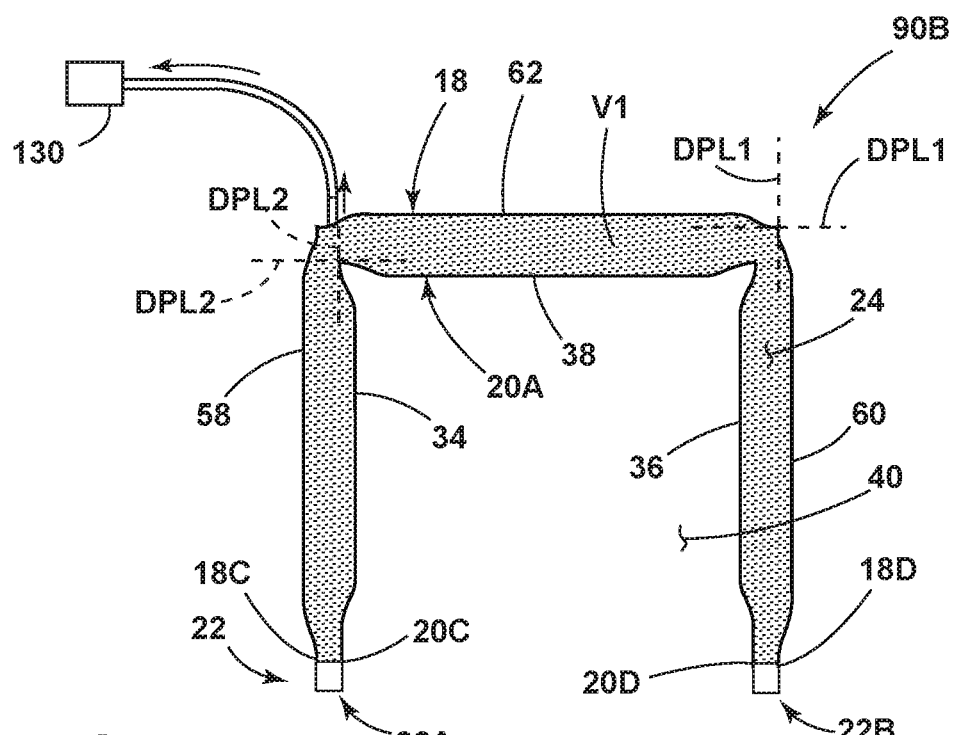
FIG. 10A is a cross-sectional view of a vacuum insulated structure according to another embodiment having pre-deformed sidewalls.
Figure 10B:
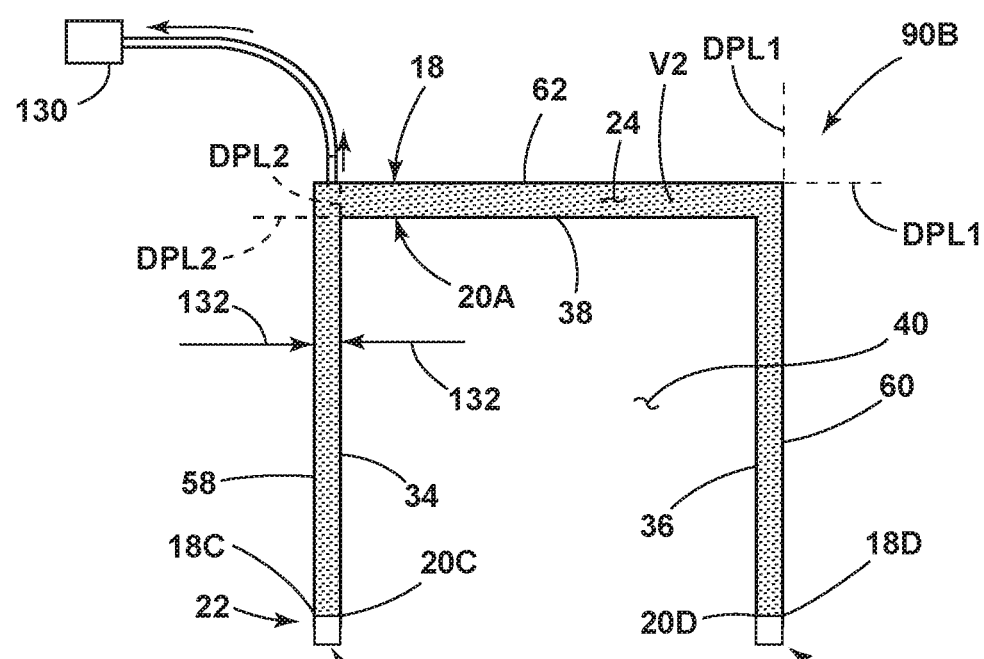
FIG. 10B is a cross-sectional view of the vacuum insulated structure of FIG. 10A after a vacuum has been drawn on the structure.

In an effort to avoid the vacuum deformation bow shown in the vacuum insulated panel 70 of FIGS. 2A-3B, the present concept includes a vacuum insulated structure having pre-deformations, as further described below. Specifically, in the embodiment shown in FIGS. 4-7, a simplified version of a vacuum insulated structure 90 is shown, wherein it is contemplated that the vacuum insulated structure 90 may include a standalone vacuum insulated panel. Further, the vacuum insulated structure 90 is also configured to represent a pre-deformation technique as applied to an entire vacuum insulated structure, such as the vacuum insulated cabinet structure 12 of FIG. 1A at the insulating cavity 24. As such, it is contemplated that the vacuum insulated structure 90 illustrates an exemplary structure having a pre-deformation technique used to provide a substantially planar structure after a vacuum has been drawn therefrom. The configuration of the vacuum insulated structure 90 is not meant to limit the scope of the present concept in any manner. Further, as shown in FIGS. 10A and 10B, the pre-deformation technique may apply to a vacuum insulated structure 90B which specifically relates to the structure of a refrigerator cabinet. Thus, the vacuum insulated structure 90 shown in FIGS. 2A-3B may represent a single sidewall of a vacuum insulated cabinet structure 90B shown in FIGS. 10A and 10B.

Figure 4:
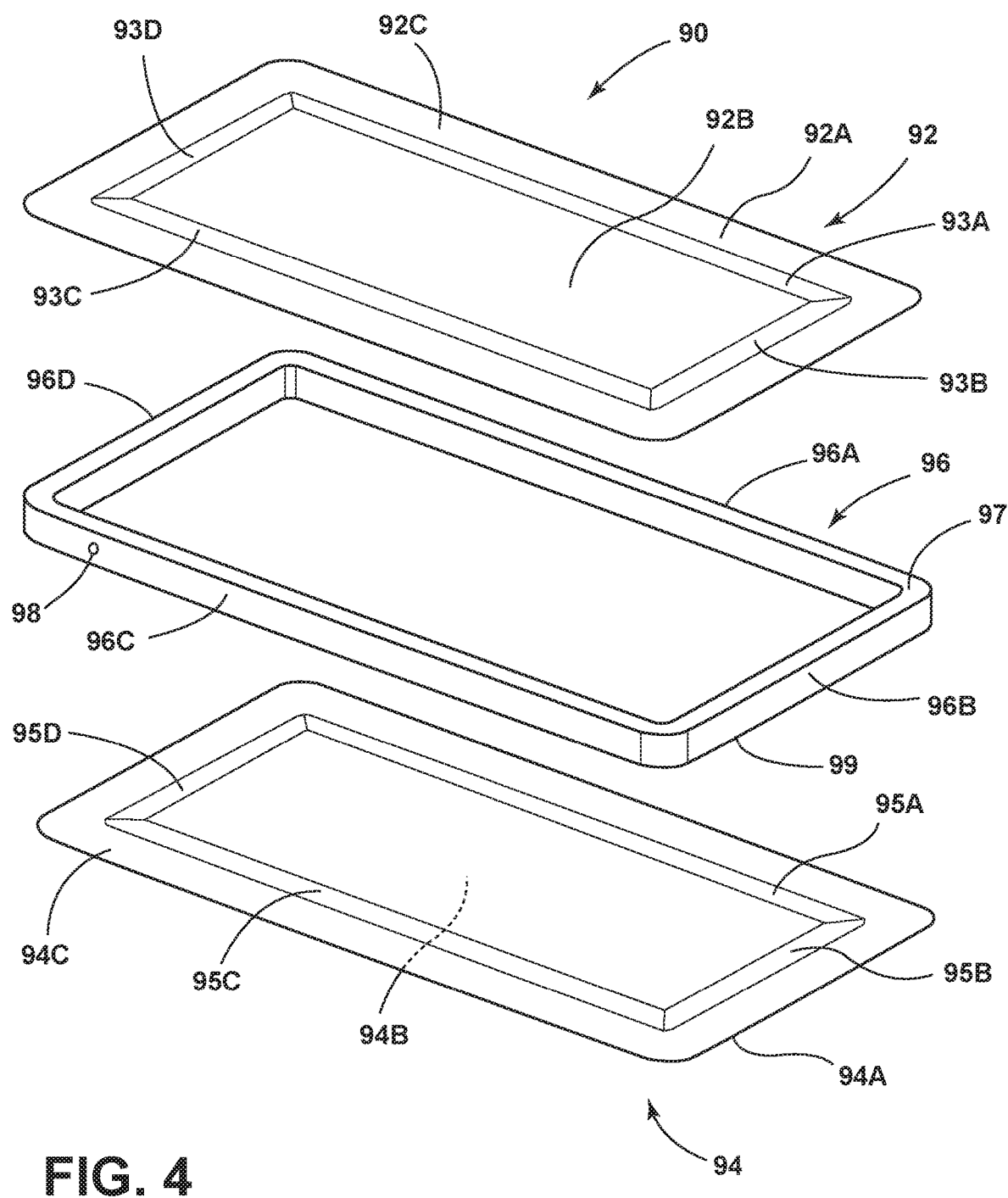
FIG. 4 is a an exploded top perspective view of a sidewall of a vacuum insulated cabinet structure according to an embodiment of the present concept.

Thus, in accordance with the present concept, a vacuum insulated structure 90 is shown in FIG. 4 in an exploded view having an upper cover member 92 and a lower cover member 94 which are spaced-apart from one another and configured to couple to a thermal bridge 96 having side members 96A-96D. An evacuation port 98 is shown disposed on the thermal bridge 96, but may be disposed on any part of the vacuum insulated structure 90 for accessing a cavity 100 (FIG. 5A). As shown in FIG. 4, the upper and lower cover members 92, 94 may include walls of the exterior wrapper 18 and the upper and lower liners 20A, 20B which are also spaced-apart from one another to define an insulating cavity 24 disposed therebetween as shown in FIG. 1A As referenced herein, the upper and lower cover members 92, 94 are described as "upper" and "lower" cover members for purposes of description only and do not define a specific configuration for the vacuum insulated structure 90. The upper and lower cover members 92, 94 define first and second cover members which are spaced-apart in assembly of the vacuum insulated structure 90, and may be disposed in any relationship to one another besides the vertical relationship shown in FIGS. 4-7. The upper cover member 92 includes an outer surface 92A having a pre-deformed portion 92B disposed in a generally central portion of the cover member 92. Similarly, the lower cover member 94 includes an outer surface 94A having a pre-deformed portion 94B disposed in a generally central portion of the cover member 94. The pre-deformed portions 92B, 94B of the upper and lower cover members 92, 94 outwardly extend from a desired planar level position as further described below with specific reference to FIG. 6. The upper and lower cover members 92, 94 include perimeter portions 92C, 94C, respectively, which surround the pre-deformed portions 92B, 94B. The perimeter portions 92C, 94C are generally disposed at the desired planar level, as further described below.

The upper and lower cover members 92, 94 are contemplated to be sheet metal cover members, wherein the pre-deformed portions 92B, 94B are stamped portions formed by a stamping process which stretches and thins specific portions around the pre-deformed portions 92B, 94B. With specific reference to upper cover member 92, weakened portions 93A-93D are shown disposed around pre-deformed portion 92B and are contemplated to be weakened portions of the cover member 92 having been stretched and thinned during a stamping process. Similarly, pre-deformed portion 94B of lower cover member 94 includes weakened portions 95A-95D which are thinned or weakened portions due to a stamping process that provides for the outwardly extending configuration of pre-deformed portion 94B. In assembly, the upper cover member 92 couples to a first surface 97 of thermal bridge 96, while lower cover member 94 couples to a second surface 99 of the thermal bridge 96. By coupling the upper cover member 92 and the lower cover member 94 to the thermal bridge 96, a cavity for the vacuum insulated structure 90 is formed. The cavity is identified as reference numeral 100 as shown in FIGS. 5A, 5B, 6 and 7 and is contemplated to represent a portion of insulating cavity 24 of vacuum insulated cabinet structure 12 shown in FIG. 1A.

Referring now to FIG. 5A, the vacuum insulated structure 90 is shown in an assembled condition as compared to the exploded view shown in FIG. 4. While the vacuum insulated structure 90 shown in FIG. 5A is provided in an at-rest or pre-evacuation stage, the structure 90 is still referred to herein as a vacuum insulated structure. In the assembled condition, the vacuum insulated structure 90 is shown having the upper and lower cover members 92, 94 coupled to the first and second surfaces 97, 99 (FIG. 4) of the thermal bridge 96. In this configuration, the pre-deformed portions 92B and 94B (FIG. 4) outwardly extend from a desired planar level configuration as raised by inclined weakened portions 93A-93D and 95A-95D, respectively. In the assembled condition shown in FIG. 5A, the vacuum insulated structure 90 includes a cavity 100 which is generally accessible via port 98 disposed in the thermal bridge 96. While the embodiment shown in FIG. 5A includes the port 98 disposed on the thermal bridge 96, it is contemplated that the port 98 can be disposed on any portion of the vacuum insulated structure 90, so long as the port provides access to the cavity 100. In assembling the vacuum insulated structure 90, the cavity 100 can be filled with an insulation medium, such as open celled foam or a microporous filler material which may optionally include particulate reflectors or opacifiers, such as aluminum, flake or carbon black, to reduce transmission of radiation energy through the vacuum insulated structure 90. The cavity 100 may also be filled with an insulating material in the form of a powder comprised of fumed silica, glass beads, processed rice husks, or any combination thereof. The insulating material is contemplated to have a conducting coefficient or thermal conductivity of at least 5 mW/m·K, or lower, to ensure that the insulating properties of the vacuum insulated structure 90 are sound. This filler material or insulating material is identified in FIGS. 6 and 7 as reference numeral 102.

Figure 5B:
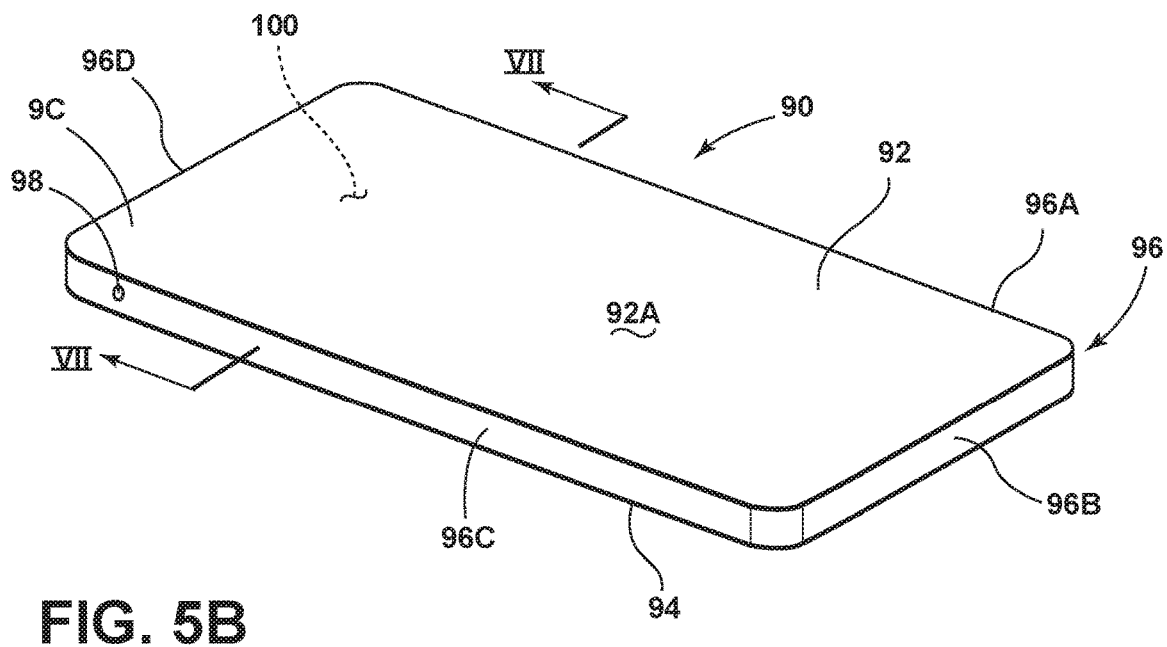
FIG. 5B is a top perspective view of the sidewall of the vacuum insulated cabinet structure of FIG. 5A after a vacuum has been drawn.

With reference to FIG. 5B, the vacuum insulated structure 90 is shown in an evacuated condition, wherein the cavity 100 has been accessed via port 98 to draw a vacuum from the cavity 100, thereby providing a low pressure environment within the cavity 100. The low pressure environment of the cavity 100 may include a reduced internal pressure of less than 10 mbar, but may include other pressure settings conditioned on a filler material used in the vacuum insulated structure 90, and also conditioned on the desired insulative value of the vacuum insulated structure 90. In FIG. 5B, the outer surface 92A of upper cover member 92 is shown to be a generally planar surface, wherein the pre-deformed portion 92B (FIG. 5A) has been pulled inwardly by the drawing of the vacuum on the vacuum insulated structure 90 to provide the substantially planar outer surface 92A of upper cover member 92. This reforming of the upper cover member 92 is also experienced on the lower cover member 94 at pre-deformed portion 94B, as further described below with reference to FIGS. 6 and 7.

Figure 6:
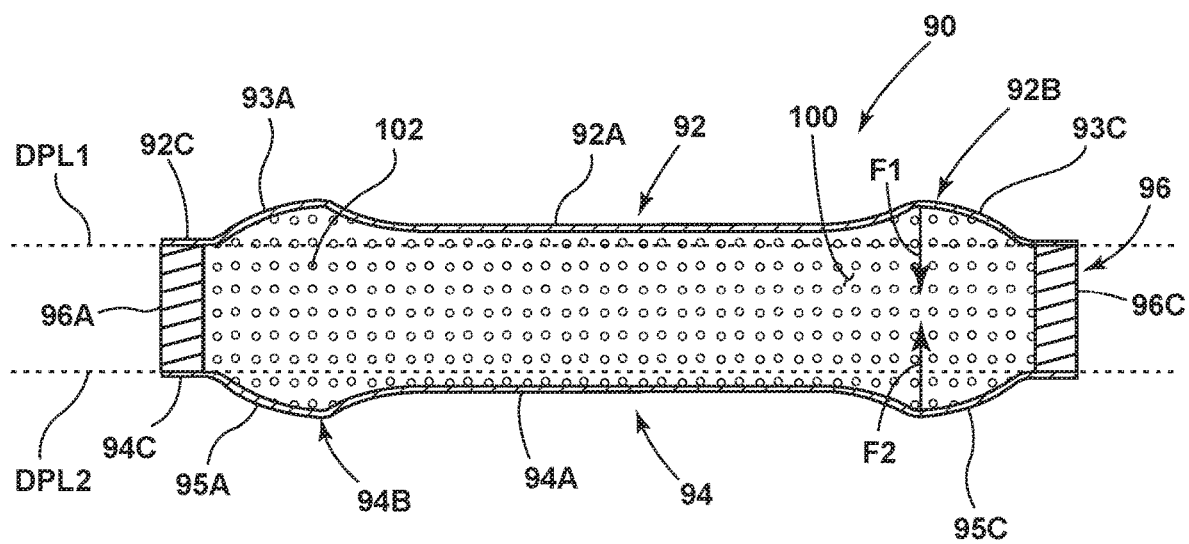
FIG. 6 is a cross-sectional view of the sidewall of the vacuum insulated cabinet structure of FIG. 5A taken at line XI.

Referring now to FIG. 6, a cross-sectional view of the vacuum insulated structure 90 of FIG. 5A is shown, wherein the pre-deformed portions 92B, 94B of the upper and lower cover members 92, 94 are shown extending outwardly from desired planar levels DPL1, DPL2, respectively. As noted above, this is generally due to the upper and lower cover members 92, 94 being subject to a stamping or forming process that pre-deforms the upper and lower cover members 92, 94 to provide outwardly extending weakened portions identified as inclined weakened portions 93A, 93C, 95A and 95C in the upper and lower cover members 92, 94 in FIG. 6. The perimeter portions 92C, 94C of the upper and lower cover members 92, 94 are shown disposed generally at the desired planar levels DPL1, DPL2, respectively. As a vacuum is drawn on the cavity 100 of the vacuum insulated structure 90, the upper and lower cover members 92, 94 are subject to inwardly directed forces F1, F2, respectively, which drive the upper and lower cover members 92, 94 towards one another. Due to the weakened condition of the weakened portions 93A, 93C, 95A, 95C, these portions of the upper and lower cover members 92, 94 are more susceptible to repositioning or collapsing as compared to the other portions of the upper and lower cover members 92, 94. Thus, due to the inwardly directed forces F1, F2 caused by the vacuum drawn within the cavity 100, the pre-deformed portions 92B, 94B of the upper and lower cover members 92, 94 are drawn inwardly toward the desired planar levels DPL1, DPL2 on the upper and lower sides of the vacuum insulated structure 90.

Figure 7:
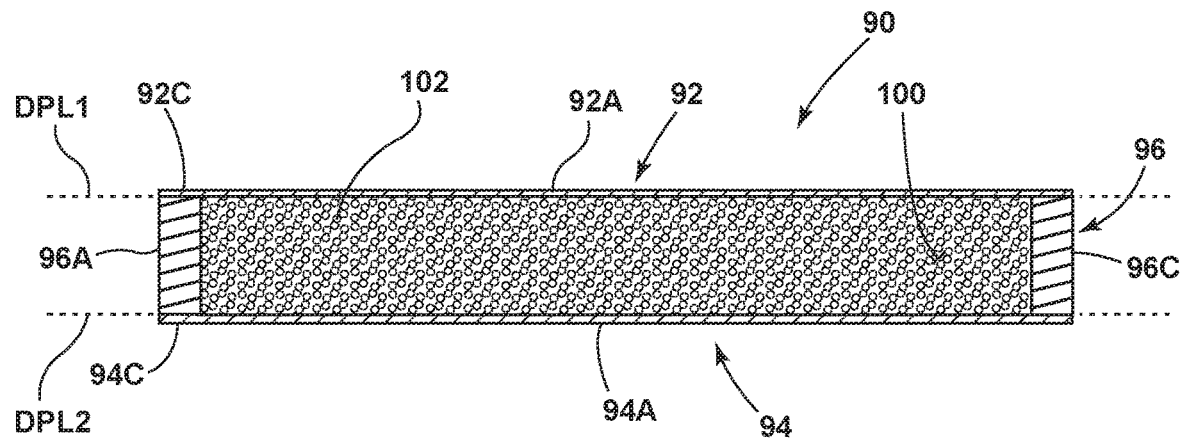
FIG. 7 is a cross-sectional view of the sidewall of the vacuum insulated cabinet structure of FIG. 5B taken at line XII.

With reference to FIG. 7, the vacuum insulated structure 90 is shown after an evacuation procedure has been preformed, such that the cavity 100 now represents an evacuated cavity. The pre-deformed portions 92B, 94B of FIG. 6 are no longer present in the vacuum insulated structure 90 of FIG. 7, as these portions have been drawn inwardly to the desired planar levels DPL1, DPL2 due to the internal forces F1, F2 acting on the pre-deformed portions 92B, 94B during the evacuation procedure. Thus, the resulting vacuum insulated structure 90 shown in FIG. 7 includes outer surfaces 92A, 94A of the upper and lower cover members 92, 94 having substantially planar configurations that are substantially in line with the desired planar levels DPL1, DPL2.

Figure 8:
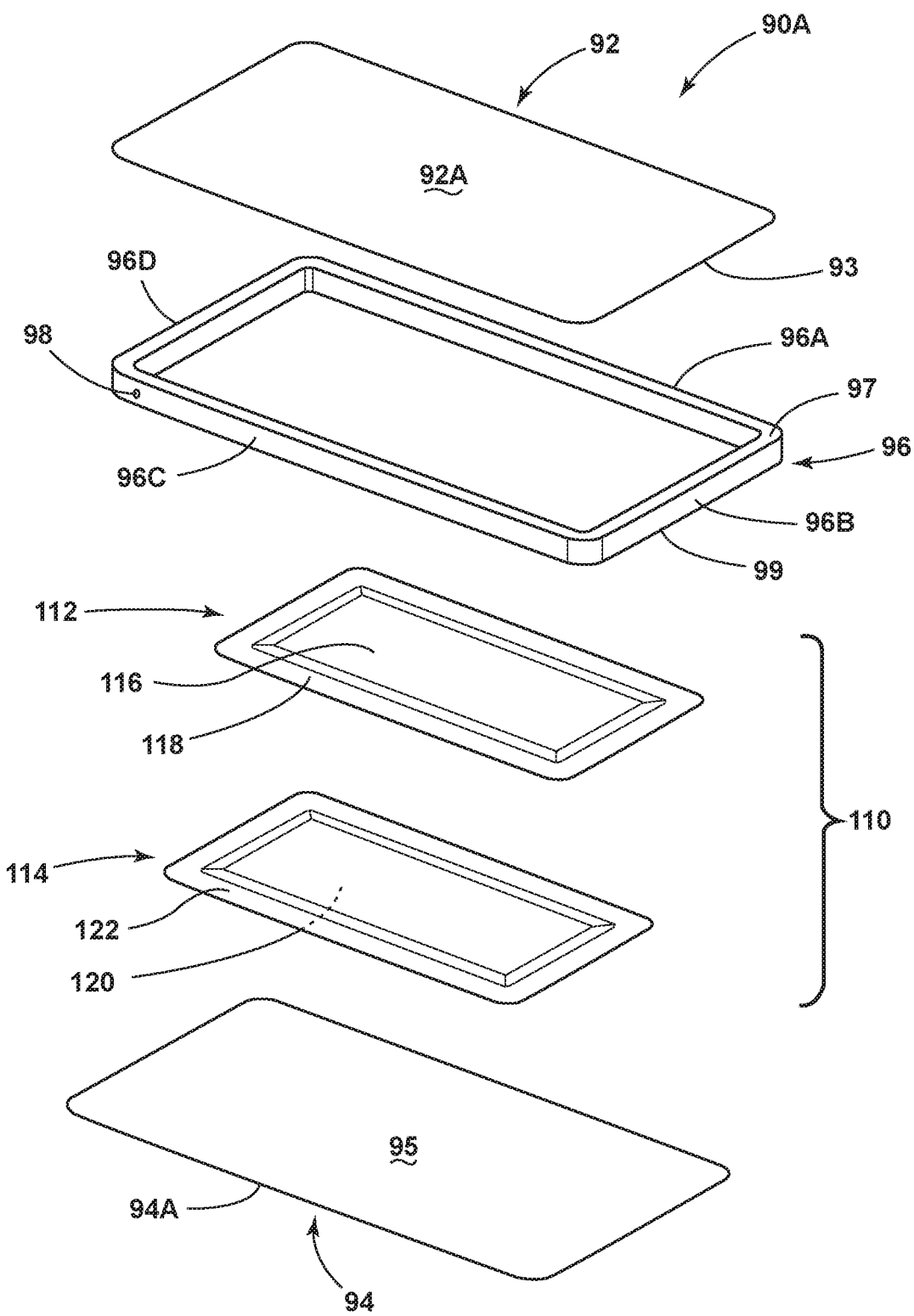
FIG. 8 is an exploded top perspective view of a sidewall of a vacuum insulated cabinet structure according to another embodiment of the present concept.
Figure 9A:
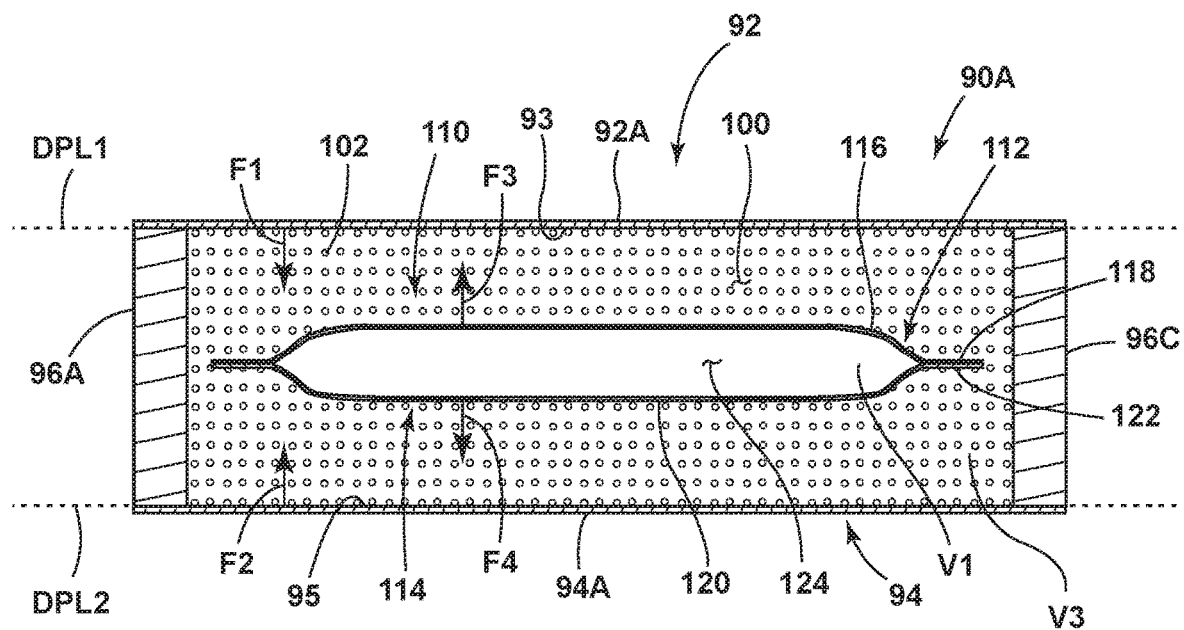
FIG. 9A is a cross-sectional view of the sidewall of the vacuum insulated cabinet structure of FIG. 8 in an assembled condition.
Figure 9B:
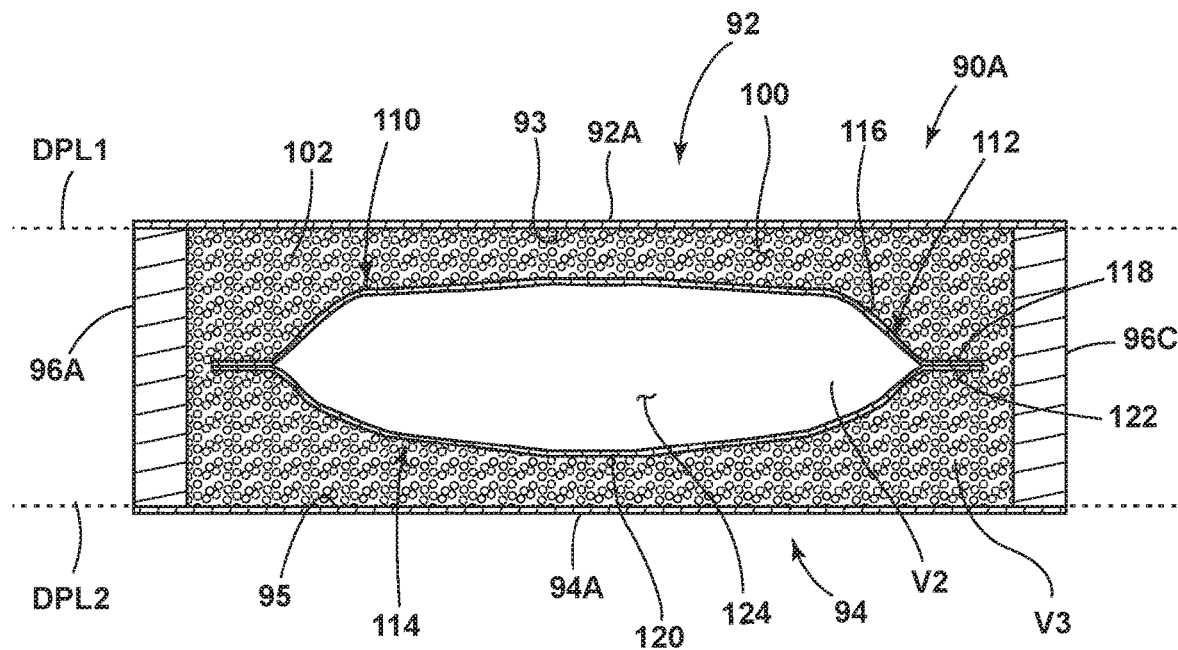
FIG. 9B is a cross-sectional view of the sidewall of the vacuum insulated cabinet structure of FIG. 9A, after a vacuum has been drawn.
Figure 11A:
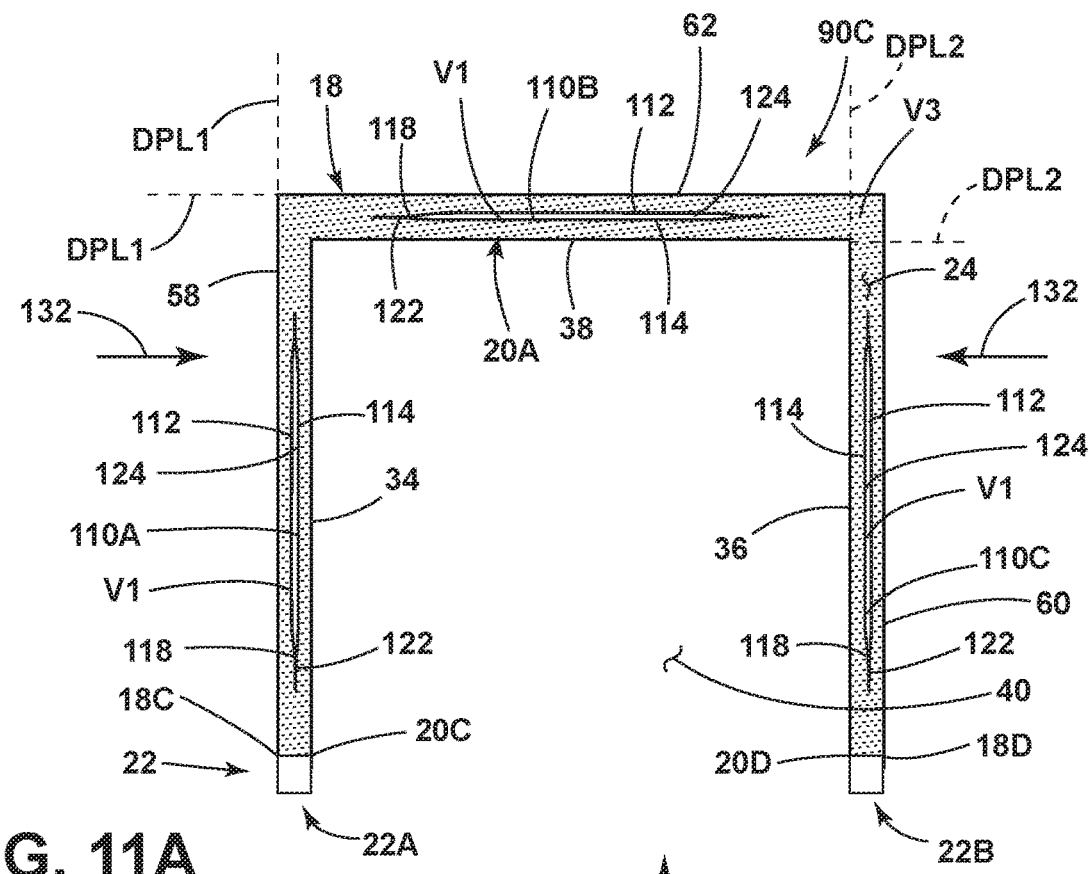
FIG. 11A is a cross-sectional view of a vacuum insulated structure according to another embodiment having internal chamber structures disposed within the sidewalls.
Figure 11B:
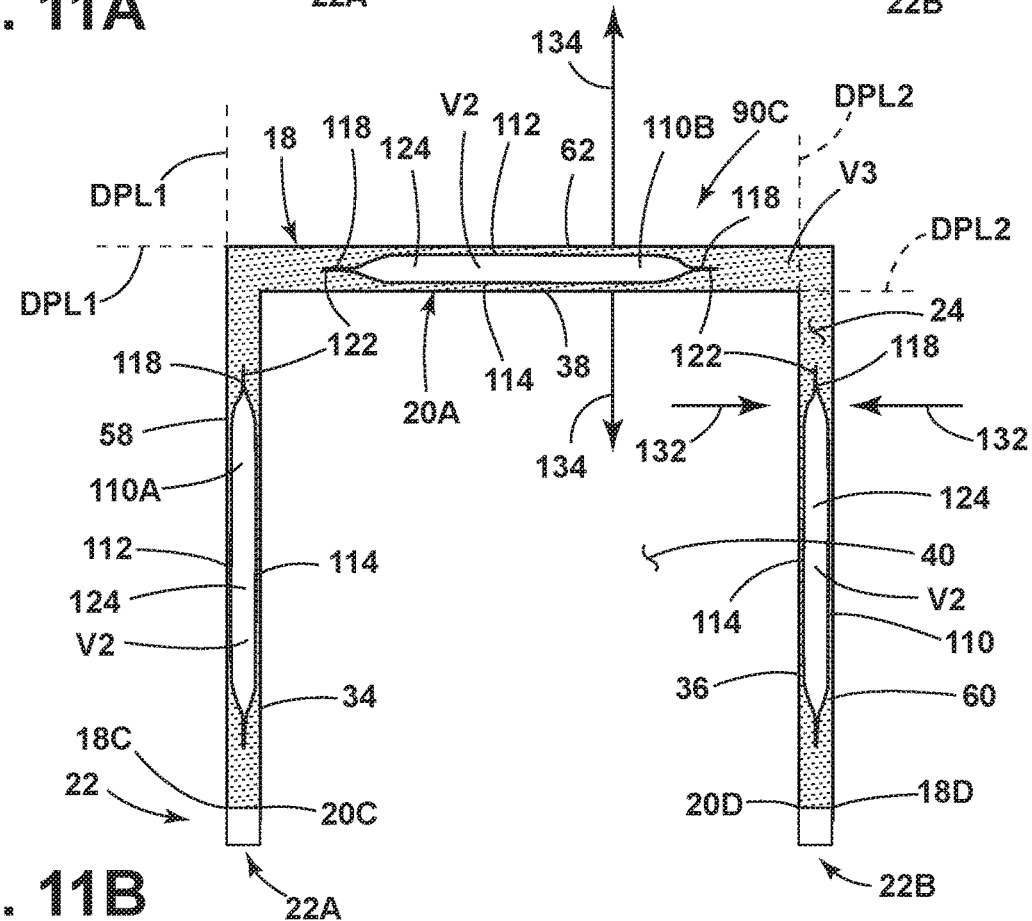
FIG. 11B is a cross-sectional view of the vacuum insulated structure of FIG. 11A after a vacuum has been drawn on the structure.

Referring now to FIG. 8, a vacuum insulated structure 90A is shown according to another embodiment of the present concept. The vacuum insulated structure 90A includes many features similar to the vacuum insulated structure 90 shown in FIG. 4, for which like reference numerals will be used to represent similar features. The vacuum insulated structure 90A is also contemplated to represent a portion of the vacuum insulated cabinet structure 12 shown in FIG. 1A. Representation of the concept described in FIGS. 8-9B is also shown in FIGS. 11A and 11B with particular reference to a vacuum insulated cabinet structure 90C. As shown in the exploded view of FIG. 8, the vacuum insulated structure 90A includes upper and lower cover members 92, 94 having outer surfaces 92A, 94A, respectively. The thermal bridge 96 includes side members 96A-96D, as well as evacuation port 98 for accessing a cavity 100 (FIG. 7) formed when the upper and lower cover member 92, 94 are coupled to the thermal bridge 96 at first and second surfaces 97, 99 of the thermal bridge 96. As further shown in FIG. 8, the vacuum insulated structure 90A includes an internal chamber structure 110 which is generally comprised of first and second panels 112, 114. The panels 112, 114 are generally mirror images of each other and are configured to be joined together and positioned within the cavity 100 of the vacuum insulated structure 90A in assembly. The first panel 112 includes an outwardly extending middle portion 116 surrounded by a generally planar perimeter portion 118. Similarly, the second panel 114 includes an outwardly extending middle portion 120 which is surrounded by a generally planar perimeter portion 122. It is further contemplated that the first and second panels 112, 114 may be substantially planar. In assembly, as best shown in FIG. 9A, the perimeter portions 118, 122 of the first and second panels 112, 114 are joined together in a sealable manner, such as by welding, crimping or otherwise adhering the first panel 112 to the second panel 114. In the vacuum insulated structure 90A, it is contemplated that the upper and lower cover members 92, 94 are comprised of a sheet metal material that is generally stronger than a sheet metal material used to form the first and second panels 112, 114. In this way, the internal chamber structure 110 is more susceptible to deformation being comprised of the first and second panels 112, 114 which include a deformability factor that is greater than a deformability factor of the upper and lower cover members 92, 94. As used herein, the term "deformability factor" is used to describe the ability or inability of a material to deform under particular conditions, such as under pressures exerted on the material during a chamber evacuation process. Thus, as further described below, the first and second panels 112, 114 are more susceptible to deformation having a higher deformability factor as compared to the upper and lower cover members 92, 94 having a lower deformability factor. Thus, when drawing a vacuum on the cavity 100 of the vacuum insulated structure 90A, the first and second panels 112, 114 of the internal chamber structure 110 are more likely to deform as compared to the upper and lower cover members 92, 94.

Referring now to FIG. 9A, the vacuum insulated structure 90A of FIG. 8 is shown in an assembled condition with the internal chamber structure 110 positioned within the cavity 100 of the vacuum insulated structure 90A. In the assembled condition, the perimeter portions 118, 122 of the first and second panels 112, 114 are joined together to define an interior cavity 124 of the internal chamber structure 110 at the outwardly extending portions 116, 120 of the first and second panels 112, 114. The interior cavity 124 is shown in FIG. 9A having a volume V1 which is an at-rest volume V1 generally defined by the inner surfaces of the first and second panels 112, 114 pre-vacuum. It is further contemplated that the at-rest volume V1 of the first and second panels 112, 114 may be a value of zero when the middle portions 116, 120 do not outwardly extend as is the case with planar first and second panels 112, 114. The middle portions 116, 120 of the first and second panels 112, 114 may in fact be in contact with one another, however, they are not joined to each other in a manner in which the parameter portions 118, 122 of the first and second panels 112, 114 are joined. In the embodiment shown in FIG. 9A, a vacuum has not been drawn on the vacuum insulated structure 90A, wherein the cavity 100 of the vacuum insulated structure 90A is accessed via port 98 (FIG. 8) for evacuating the cavity 100. During the evacuation of cavity 100, the internal pressure of the cavity 100 is contemplated to drop to a low pressure setting of approximately less than 10 mbar. When drawing this vacuum, forces F1, F2 will act on the inner surfaces 93, 95 of the upper and lower cover members 92, 94 in an inward direction towards one another as indicated in FIG. 9A. In the at-rest state (pre-vacuum) shown in FIG. 9A, the upper and lower cover members 92, 94 are substantially in-line with the desired planar levels DPL1, DPL2, respectively, to provide a clean aesthetic for the vacuum insulated structure 90A. As such, during the drawing of the cavity 100, any deformation or repositioning of the upper and lower cover members 92, 94 is undesirable.

As noted above, the first and second panels 112, 114 of the internal chamber structure 110 have a deformability factor that is greater than the deformability factor of the upper and lower cover members 92, 94. When a vacuum is drawn on the cavity 100 of the vacuum insulated structure 90A, outwardly directed forces F3, F4 will act on the first and second panels 112, 114 in an outward direction as indicated in FIG. 9A. With the first and second panels 112, 114 being more susceptible to deformation as compared to the upper and lower cover members 92, 94, the internal chamber structure 110 is configured to outwardly deform in a controlled manner as the vacuum is drawn on cavity 100. By deforming the internal chamber structure 110, the upper and lower cover members 92, 94 can resist deformation and remain within the parameters of the desired planar levels DPL1, DPL2 to retain the shape of the vacuum insulated structure 90A. The interior cavity 124 is a sealed cavity, such that the internal chamber structure 110 will deform and the slightly positive pressure of cavity 100 under vacuum will not be lost.

Thus, referring now to FIG. 9B, the vacuum insulated structure 90A is shown after a vacuum or evacuation procedure has been performed. The upper and lower cover members 92, 94 are shown positioned in a substantially identical configuration along desired planar levels DPL1, DPL2 as found in FIG. 9A. Thus, an interior volume V3 of the cavity 100 is unchanged from FIG. 9A to FIG. 9B. The internal chamber structure 110 has deformed due to the higher deformability factor of first and second panels 112, 114 as compared to upper and lower cover members 92, 94. The deformation of the internal chamber structure 110 provides for an increased volume V2 of the interior cavity 124 as compared to the at-rest volume V1 of the interior cavity 124 shown in FIG. 9A. Thus, the drawing of the vacuum on the cavity 100 has deformed the internal chamber structure 110 due to its higher susceptibility to deformation, while leaving the upper and lower cover members 92, 94 in alignment with the desired planar levels DPL1, DPL2. The drawing of the vacuum on the cavity 100 is contemplated to decrease the internal pressure of the cavity 100 from about 1 atm to less than 10 mbar.

Referring now to FIG. 10A, a cross-sectional view of a vacuum insulated structure 90B is shown, wherein the vacuum insulated structure 90B includes a number of features that are the same or similar to features of the vacuum insulated cabinet 12 shown in FIGS. 1A and 1B, for which like reference numerals are used as identifiers. In the cross-sectional view of FIG. 10A, the vacuum insulated structure 90B includes an exterior wrapper 18 and an upper liner 20A. As noted above, the upper liner 20A includes sidewalls 34, 36 and a rear wall 38 (collectively referred to as sidewalls) which cooperate to define a refrigerator compartment 40. The exterior wrapper 18 includes sidewalls 58, 60 and a rear wall 62 (collectively referred to as sidewalls) which cooperate to define outer parameters of the vacuum insulated structure 90B. As noted above, the exterior wrapper 18 and upper liner 20A are spaced-apart from one another to define an insulating cavity 24 therebetween. The insulating cavity 24 includes a filler such as an insulating medium identified above. Particularly, the insulating medium may include a powder having a thermal conductivity of at least 5 mW/m·k or lower. Thus, the vacuum insulated structure 90B represents a cross-sectional view of a refrigerator compartment, wherein the exterior wrapper 18 and upper liner 20A are interconnected at first and second sides 22A, 22B of the thermal bridge 22, also shown in FIG. 1B. Specifically, the exterior wrapper 18 includes first and second ends 18C, 18D while the upper liner 20A includes first and second ends 20C, 20D which are shown connected in a spaced-apart relationship at first and second side members 22A, 22B of the thermal bridge 22. As further shown in the embodiment of FIG. 10A, a vacuum pump 130 is shown operably coupled to the insulating cavity 24 of the vacuum insulated structure 90B to draw a vacuum therefrom. The vacuum insulated structure 90B of FIG. 10A includes pre-deformations in the sidewalls 58, 60 and rear wall 62 of the exterior wrapper 18, wherein the pre-deformations extend outwardly beyond a first desired planar level DPL1 for the exterior wrapper 18. Similarly, the upper liner 20A includes pre-deformations in the sidewalls 34, 36 and rear wall 38, such that the sidewalls 34, 36 and rear wall 38 of the upper liner 20A include portions which outwardly extend from a second desired planar level DPL2 for the vacuum insulated structure 90B. In FIG. 10A, the insulating cavity 24 includes a first interior volume V1.

Referring now to FIG. 10B, it is contemplated that a vacuum has been drawn on the insulating cavity 24 via vacuum pump 130 such that the forces 132 associated with the vacuum have collapsed the pre-deformations found in the exterior wrapper 18 and upper liner 20A, such that the sidewalls and rear walls thereof are now in-line with the desired planar levels DPL1, DPL2 indicated in FIG. 10B. In this way, the pre-deformations have provided structural defects that are pulled inwardly due to the forces 132 pulling on the sidewalls and rear walls of the exterior wrapper 18 and upper liner 20A by the vacuum power generated by vacuum pump 130, such that the vacuum insulated structure 90B now includes a generally planar structure for the outer surfaces of the exterior wrapper 18 and upper liner 20A. The insulating cavity 24 shown in FIG. 10B includes a second interior volume V2 that is less than the first interior volume V1 (FIG. 10A).

Referring now to FIG. 11A, a vacuum insulated structure 90C is shown having exterior wrapper 18 and upper liner 20A interconnected by the thermal bridge 22 in a manner as found in FIGS. 10A and 10B described above. In the embodiment shown in FIG. 11A, the vacuum insulated structure 90C is shown having the sidewalls 58, 60 and rear wall 62 of the exterior wrapper 18 positioned in-line with a first desired planar level DPL1. Similarly, the first and second sidewalls 34, 36 and rear wall 38 of the upper liner 20A are also shown positioned at a second desired planar level DPL2, such that the vacuum insulated structure 90C is configured in a pre-vacuum state having the desired parameters for the vacuum insulated structure 90C already in place. As further shown in FIG. 11A, the insulating cavity 24 has a volume V3 with an insulating material disposed therein. As further shown in FIG. 11A, internal chamber structures 110A, 110B and 110C are shown disposed within the insulating cavity 24 at the sidewalls and rear wall of the vacuum insulated structure 90C. Each one of the internal chamber structures 110A-110C includes first and second panels 112, 114 coupled together at perimeter portions 118, 122 thereof to define interior cavities 124 having at-rest or pre-vacuumed volumes V1. In a manner similar to the vacuum insulated structure 90A shown in FIGS. 9A and 9B, the walls that make up the exterior wrapper 18 and upper liner 20A are considered to have a deformability factor that is lower than a deformability factor of the first and second panels 112, 114 of each of the internal chamber structures 110A-110C. Thus, as a vacuum is drawn on insulating cavity 24, the internal chamber structures 110A-110C are more likely to deform than the walls of the exterior wrapper 18 and upper liner 20A.

Referring now to FIG. 11B, the vacuum insulated structure 90C is shown and contemplated to have a vacuum drawn on the insulating cavity 24. As shown in FIG. 11B, the vacuum insulating cavity 24 includes a volume V3 that is the same as the volume V3 shown in FIG. 11A. Thus, it is contemplated that the walls of the exterior wrapper 18 and upper liner 20A have remained in-line with the first and second desired planar levels DPL1, DPL2, respectively, such that the vacuum insulated structure 90C has not deformed due to the vacuum being drawn on the insulating cavity 24. It is contemplated that forces 132 are acting on the walls of the exterior wrapper 18 and upper liner 20A to pull the walls inwardly as indicated in FIG. 11B. However, with the deformability factor of the first and second panels 112, 114 of the internal chamber structures 110A-110C being higher than that of exterior wrapper 18 and upper liner 20A, the internal chamber structures 110A-110C are more susceptible to deformation than the walls of the exterior wrapper 18 and upper liner 20A, the internal chamber structures 110A, 110C are shown in a deformed state having a volume V2 that is greater than the volume V1 shown in FIG. 11A. Thus, it is contemplated as the vacuum is drawn on the insulating cavity 24, forces 132 are realized on the first and second panels 112, 114 to pull the panels 112, 114 apart from one another to create a second volume V2 for the internal chamber structures 110A-110C. In this way, the internal chamber structures 110A-110C deform as a vacuum is drawn on the insulating cavity 24, while the parameter walls of the exterior wrapper 18 and upper liner 20A remain intact at the first and second desired planar levels DPL1, DPL2, respectively, with an unchanged volume V3 for the insulating cavity 24.

Another aspect of the present concept includes a method of making a vacuum insulated cabinet structure, such as cabinet structures 12 and 90C. The method includes the steps of: 1) providing first and second panel members 112, 114; 2) coupling the first and second panel members 112, 114 to one another to define an internal chamber structure 110 having a sealed interior cavity 124 with a first interior volume V1; 3) providing an exterior wrapper 18 having a receiving cavity 64; 4) positioning at least one liner 20A, 20B in the receiving cavity 64 of the exterior wrapper 18; 5) positioning one or more of the internal chamber structures 110A-110C in a space between the exterior wrapper 18 and at least one liner 20A, 20B; 6) providing a thermal bridge 22 interconnecting the exterior wrapper 18 and the at least one liner 20A, 20B to define an insulating cavity 24 therebetween having an interior volume V3, the one or more of the internal chamber structures 110A-110C positioned within the insulating cavity 24; 7) drawing a vacuum in the insulating cavity 24; and 8) deforming the one or more internal chamber structures 110A-110C, such that the interior cavities 124 of the one or more internal chamber structures 110A-110C outwardly deform to provide a second interior volume V2 that is greater than the first interior volume V1.

Another aspect of the present concept includes a method of making a vacuum insulated cabinet structure, such as cabinet structures 12 and 90B. The method includes the steps of: 1) providing an exterior wrapper 18 having a receiving cavity 64 defined by a plurality of sidewalls 54, 56, 58, 60, and 62; 2) outwardly deforming one or more of the sidewalls 54, 56, 58, 60, and 62 such that the sidewalls 54, 56, 58, 60, and 62 include pre-deformations outwardly extending beyond a desired planar level DPL1; 3) providing at least one liner 20A having a plurality of sidewalls 30, 32, 34, 36 and 38 defining a refrigerator compartment 40; 4) outwardly deforming one or more of the sidewalls 30, 32, 34, 36 and 38 such that the sidewalls 30, 32, 34, 36 and 38 include pre-deformations outwardly extending beyond a desired planar level DPL2; 5) positioning the least one liner 20A in the receiving cavity 64 of the exterior wrapper 18; 6) providing a thermal bridge 22 interconnecting the exterior wrapper 18 and the at least one liner 20A to define an insulating cavity 24 therebetween having a first interior volume V1; 7) drawing a vacuum in the insulating cavity 24; and 8) collapsing the pre-deformations of the sidewalls 54, 56, 58, 60, and 62 of the exterior wrapper 18 and the pre-deformations of the sidewalls 30, 32, 34, 36 and 38 of the at least one liner 20A to draw the sidewalls 54, 56, 58, 60, and 62 of the exterior wrapper 18 into alignment with the desired planar level DPL1 and further draw the sidewalls 30, 32, 34, 36 and 38 of the at least one liner 20A into alignment with the desired planar level DPL2; and 9) decreasing the first interior volume V1 of the insulating cavity 24 to a second interior volume V2.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method of making a vacuum insulated structure, the method comprising:
   providing first and second cover members, wherein the first and second cover members are sheet metal cover members;
   pre-deforming the first and second cover members in a sheet metal stamping process to form pre-deformed portions on each of the first and second cover members, wherein the pre-deformed portion of the first cover member extends outwardly from a first planar level of the first cover member, and further wherein the pre-deformed portion of the second cover member extends outwardly from a second planar level of the second cover member, and further wherein the sheet metal stamping process provides inclined weakened portions on the first and second cover members;
   operably coupling the first and second cover members to one another to form an insulating cavity therebetween;
   introducing an insulation material into the insulating cavity;
   drawing a vacuum on the insulating cavity;
   drawing the pre-deformed portions of the first and second cover members inwardly towards the first and second planar levels of the first and second cover members, respectively, under a force provided by the vacuum; and
   sealing the insulating cavity to maintain the vacuum.

2. The method of claim 1, wherein the step of drawing the vacuum includes drawing a vacuum of less than 10 mbar within the insulating cavity.

3. The method of claim 1, including the step of:
   introducing an insulation material into the insulating cavity, the insulation material having a thermal conductivity of 5 mW/mK or lower.

* * * * *